United States Patent
Gong

(10) Patent No.: US 10,237,520 B2
(45) Date of Patent: Mar. 19, 2019

(54) IMAGING SYSTEM

(71) Applicant: UNION OPTECH CO., LTD., Zhongshan, Guangdong (CN)

(72) Inventor: Junqiang Gong, Guangdong (CN)

(73) Assignee: UNION OPTECH CO., LTD., Zhongshan (CN)

( * ) Notice: Subject to any disclaimer, the term of this patent is extended or adjusted under 35 U.S.C. 154(b) by 0 days.

(21) Appl. No.: 15/782,821

(22) Filed: Oct. 12, 2017

(65) Prior Publication Data

US 2018/0376113 A1   Dec. 27, 2018

(30) Foreign Application Priority Data

Jun. 23, 2017  (CN) .......................... 2017 1 0484286

(51) Int. Cl.
| | |
|---|---|
| *G02B 5/04* | (2006.01) |
| *H04N 9/04* | (2006.01) |
| *H04N 5/225* | (2006.01) |
| *H04N 9/097* | (2006.01) |

(52) U.S. Cl.
CPC .............. *H04N 9/097* (2013.01); *G02B 5/04* (2013.01); *H04N 5/2254* (2013.01); *H04N 9/045* (2013.01)

(58) Field of Classification Search
CPC .... G02B 27/1066; G02B 27/144; G02B 5/04; G02B 5/2254; H04N 5/2254; H04N 9/09; H04N 9/097; H04N 9/045
USPC ........................................................ 348/337
See application file for complete search history.

(56) References Cited

U.S. PATENT DOCUMENTS

| | | | |
|---|---|---|---|
| 8,520,138 B1* | 8/2013 | Seale ................... | H04N 5/2251 348/336 |
| 9,675,236 B2* | 6/2017 | McDowall ......... | A61B 1/00009 |
| 2007/0146700 A1* | 6/2007 | Kowarz .................... | G01J 3/02 356/310 |
| 2007/0146710 A1* | 6/2007 | Kowarz ............... | G01N 21/255 356/416 |
| 2014/0092282 A1* | 4/2014 | Morishita ................ | G01J 3/26 348/262 |
| 2014/0347547 A1* | 11/2014 | Yatsuri ............... | H04N 5/23212 348/349 |
| 2016/0178917 A1* | 6/2016 | Saita ........................ | G02B 5/04 348/336 |
| 2017/0188012 A1* | 6/2017 | Takagi ..................... | H04N 5/33 |
| 2017/0219834 A1* | 8/2017 | Horiguchi ................ | G02B 5/26 |

(Continued)

*Primary Examiner* — Pritham D Prabhakher

(57) ABSTRACT

The present invention discloses an imaging system, including an optical lens, where a spectroscopical module that can split a light wave transmitted from the optical lens into three light waves in different wavelength ranges is disposed on an imaging side of the optical lens; and the imaging system further includes three photosensitive chips configured to receive corresponding light waves, where the three photosensitive chips are correspondingly distributed at three light waves emitted by the spectroscopical module, and the spectroscopical module is a prism. In the present invention, a spectroscopical module is used to separate light whose wavelengths are different, and therefore light waves that are output from the spectroscopical module are three light waves in different wavelength ranges. These light waves in the different wavelength ranges are separately received by three different photosensitive chips. Therefore, each separate photosensitive chip receives a light wave whose wavelength range is relatively narrow.

5 Claims, 2 Drawing Sheets

(56) References Cited

U.S. PATENT DOCUMENTS

2017/0245744 A1* 8/2017 McDowall .......... A61B 1/00009
2017/0289467 A1* 10/2017 Yamamoto ................ G01J 3/28
2017/0315370 A1* 11/2017 Kim ........................ G02B 5/04
2017/0339377 A1* 11/2017 Hashimoto ........... G02B 27/146
2018/0120221 A1* 5/2018 Mohan ................. G01N 21/255

* cited by examiner

IMAGING SYSTEM

CROSS REFERENCE TO RELATED APPLICATIONS

The present application claims the benefit of Chinese Patent Application No. 201710484286.9 filed on Jun. 23, 2017. All the above are hereby incorporated by reference.

BACKGROUND

Technical Field

The present invention relates to an optical system, and in particular, to an imaging system.

Related Art

With rapid development of an imaging technology, a requirement on optical imaging quality is becoming higher. On one hand, to achieve high-resolution imaging, an object to be shot should be clear enough. On the other hand, in environment conditions with different illuminancy, color restoration imaging with high image quality including a high resolution is required. Especially, in a low lighting condition of dusk or night, a security monitoring lens or an in-vehicle camera lens requires clear imaging, and identification of a particular object such as a traffic light or a road condition identifier.

In an existing optical imaging system, a manner of matching a single lens with a single photosensitive chip is used. For the single photosensitive chip, a wavelength of a received light wave needs to be relatively wide, and wavelengths reflecting various colors are not well restored in the single photosensitive chip, causing color restoration and color contrast of an entire picture to be not good. In addition, in an environment with low illuminancy, wavelengths of some light waves cannot be utilized, causing an overall amount of passed light to decrease, and a shot image to be unclear.

To resolve the foregoing problem, the present invention provides an optical imaging system structure, to eliminate disadvantages and defects of an existing imaging system.

SUMMARY

A technical problem needs to be resolved in the present invention is to provide an imaging system. The imaging system may meet high-quality imaging requirements in environment conditions with different illuminancy, such as security monitoring, in-vehicle camera shooting, and a mobile terminal such as an intelligent mobile phone or a camera.

To resolve the foregoing technical problem, the present invention uses the following technical solution. An imaging system includes an optical lens, where a spectroscopical module that can split a light wave transmitted from the optical lens into three light waves in different wavelength ranges is disposed on an imaging side of the optical lens; and the imaging system further includes three photosensitive chips configured to receive corresponding light waves, where the three photosensitive chips are correspondingly distributed at three light waves emitted by the spectroscopical module, and the spectroscopical module is a prism.

According to the foregoing imaging system, the imaging system further includes an image processing module that can integrate and output light waves received by the photosensitive chips.

According to the foregoing imaging system, the spectroscopical module includes a first spectroscopical component and a second spectroscopical component; the first spectroscopical component splits a light wave transmitted from the optical lens into two light waves, where one light wave is transmitted to a photosensitive chip, and the other light wave enters the second spectroscopical component; and the second spectroscopical component splits the light wave transmitted from the first spectroscopical component into two light waves, and separately transmits the two light waves to corresponding photosensitive chips.

According to the foregoing imaging system, the wavelength ranges of the three light waves are respectively 600 nm to 680 nm and 820 nm to 880 nm, 500 nm to 580 nm and 820 nm to 880 nm, and 400 nm to 480 nm and 820 nm to 880 nm.

According to the foregoing imaging system, the photosensitive chip corresponding to the light wave emitted by the first spectroscopical component is disposed on one side of the first spectroscopical component, and the two photosensitive chips corresponding to the two light waves emitted by the second spectroscopical component are disposed on two sides of the second spectroscopical component.

According to the foregoing imaging system, the optical lens is a fixed-focus optical lens.

According to the foregoing imaging system, the optical lens is a varifocal optical lens.

Compared with the prior art, the imaging system in the present invention achieves the following effects:

1. In the present invention, a spectroscopical module is used to separate light whose wavelengths are different, and therefore light waves that are output from the spectroscopical module are three light waves in different wavelength ranges. These light waves in the different wavelength ranges are separately received by three different photosensitive chips. Therefore, each separate photosensitive chip receives a light wave whose wavelength range is relatively narrow, thereby improving definition of a photosensitive chip, and greatly improving definition of an entire picture finally formed by the shooting system.

2. In the present invention, a spectroscopical module is used to separate light whose wavelengths are different, and therefore light waves that are output from the spectroscopical module are three light waves in different wavelength ranges. These light waves in the different wavelength ranges are separately received by three different photosensitive chips. Therefore, a wavelength range of an integral light wave received by three photosensitive chips added together is relatively wide, all wavelengths reflecting various colors can be fully utilized, and for an overall picture formed by light waves received by the three photosensitive chips added together, the color is truer to life and fuller.

3. In the present invention, a spectroscopical module is used to separate light whose wavelengths are different, and therefore light waves that are output from the spectroscopical module are three light waves in different wavelength ranges. These light waves in the different wavelength ranges are separately received by three different photosensitive chips. Therefore, in low illuminancy, three photosensitive chips that receive light waves in different wavelength ranges are added together, so that a wavelength range of an available light wave becomes wide, increasing an amount of overall passed light, and thereby ensuring that an imaging picture is kept clear even when light is very dim.

BRIEF DESCRIPTION OF THE DRAWINGS

The following further describes a specific implementation of the present invention in detail with reference to the accompanying drawings, where.

Descriptions about the accompanying drawings: 1. Optical lens; 2. Spectroscopical module; 21. First spectroscopical component; 22. Second spectroscopical component; 3. Photosensitive chip.

DETAILED DESCRIPTION

The following describes an implementation of the present invention in detail with reference to the accompanying drawings.

Figure 1:
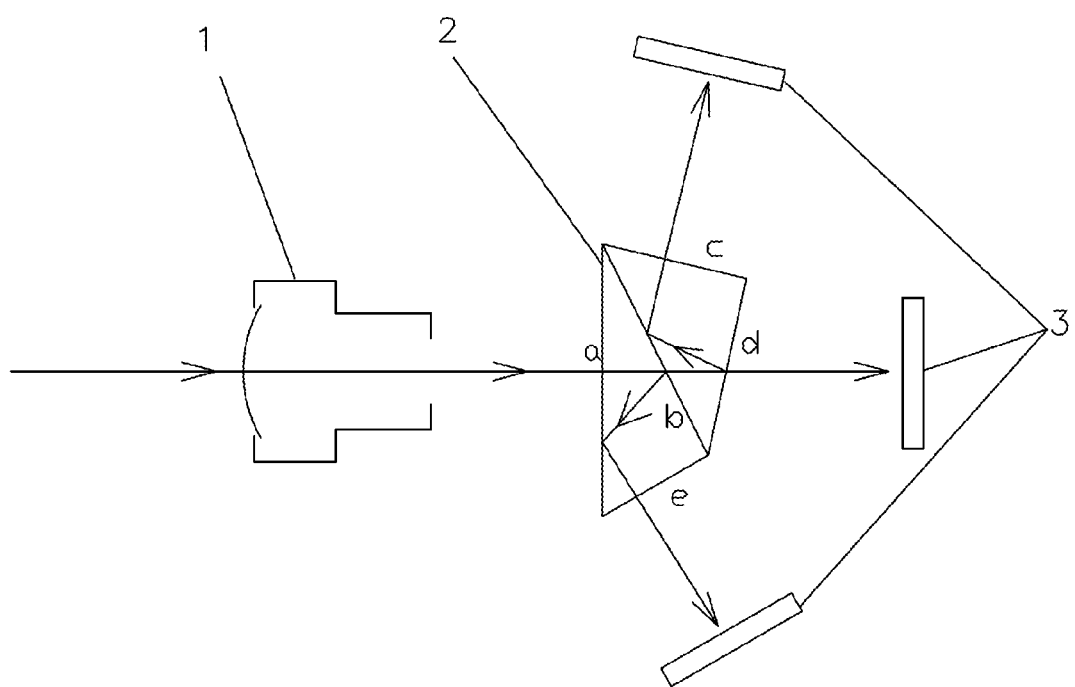
FIG. 1 is a schematic diagram of the present invention.
Figure 2:
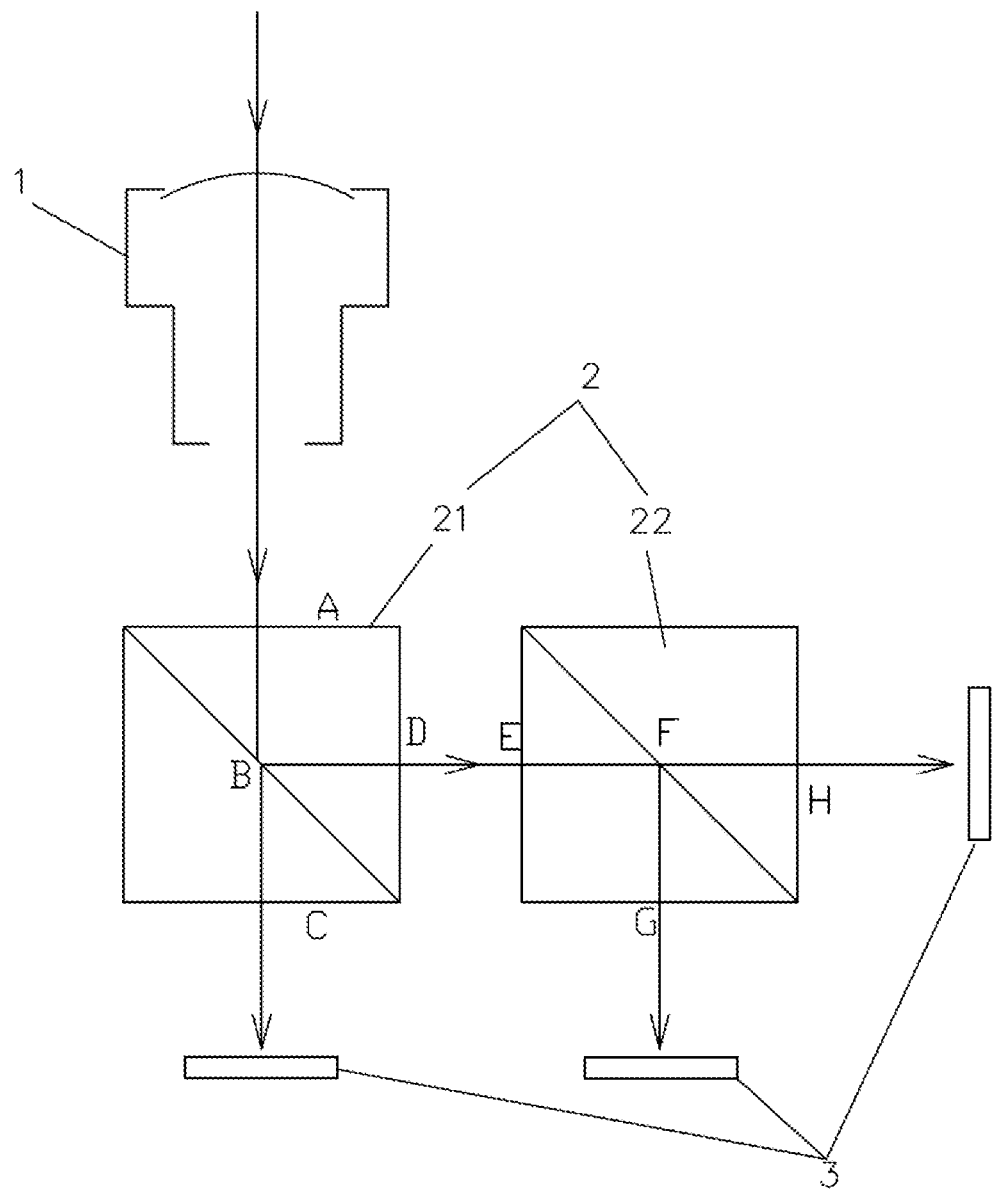
FIG. 2 is another schematic diagram of the present invention.

As shown in FIG. 1 and FIG. 2, an imaging system includes an optical lens 1, where a spectroscopical module 2 that can split a light wave transmitted from the optical lens 1 into three light waves in different wavelength ranges is disposed on an imaging side of the optical lens 1; and the imaging system further includes three photosensitive chips 3 configured to receive corresponding light waves, where the three photosensitive chips 3 are correspondingly distributed at three light waves emitted by the spectroscopical module 2, and the spectroscopical module 2 is a prism. The spectroscopical module may be a multifaceted prism structure, or may be a combination of prism structures. This is not specifically limited herein.

The spectroscopical module can implement transmission or reflection of light in a different-band spectrum. Incident light may be divided into three light beams with different bands, and the optical wavelength range mainly corresponds to light of three primary colors RGB for imaging and near infrared light.

A wavelength range of a light beam is 600 nm to 680 nm and 820 nm to 880 nm, and the light beam is mainly red light and near infrared light.

A wavelength range of a light beam is 500 nm to 580 nm and 820 nm to 880 nm, and the light beam is mainly green light and near infrared light.

A wavelength range of a light beam is 400 nm to 480 nm and 820 nm to 880 nm, and the light beam is mainly blue light and near infrared light.

As shown in FIG. 1 and FIG. 2, in this embodiment, the imaging system further includes an image processing module that can integrate and output light waves received by the photosensitive chips 3.

As shown in FIG. 1, incident light is focused by an optical lens, a spectroscopical module is a component prism, emergent light passes through a face a of the component prism and is projected to a face b. A reflected light beam, mainly blue light and near infrared light, is reflected by the face b and the face a, penetrates a face e, and then forms an image on a photosensitive chip. The projected light passes through the face b, is projected to a face d, and then a light beam, mainly green light and near infrared light, penetrates the face d and forms an image on a photosensitive chip. A light beam, mainly red light and near infrared light, is reflected by the face d and the face b, penetrates a face c, and then forms an image on a photosensitive chip. The three photosensitive chips separately receive light waves in particular wavelength ranges, and finally the image processing module implements restoration and reproduction of an image, thereby increasing definition of an optical system, enhancing color restoration, and implementing that an imaging system can form a clear image in environments with different illuminancy.

As shown in FIG. 1 and FIG. 2, in this embodiment, the spectroscopical module 2 includes a first spectroscopical component 21 and a second spectroscopical component 22. The first spectroscopical component 21 divides a light wave transmitted by the optical lens 1 into two light waves. One light wave is transmitted to the photosensitive chip 3, and the other light wave enters the second spectroscopical component 22. The second spectroscopical component 22 divides a light wave transmitted by the first spectroscopical component 21 into two light waves, and then separately transmits the two light waves to corresponding photosensitive chips 3. Finally, three light waves in different wavelength ranges are formed, and transmitted to corresponding photosensitive chips.

As shown in FIG. 1 and FIG. 2, in this embodiment, the photosensitive chip 3 corresponding to the light wave emitted by the first spectroscopical component 21 is disposed on one side of the first spectroscopical component 21, and the two photosensitive chips 3 corresponding to the two light waves emitted by the second spectroscopical component 22 are disposed on two sides of the second spectroscopical component 22.

As shown in FIG. 2, incident light is focused by an optical lens, and after emergent light passes through a face A on the first spectroscopical component and is projected to a face B, a transmission light beam, mainly red light and near infrared light, penetrates the face B, passes through a face C, and forms an image on a photosensitive chip. Reflected light is reflected by the face B, penetrates a face D, passes through a face E of the second spectroscopical component, and is projected to a face F. A light beam, mainly green light and near infrared light, is reflected by the face F, penetrates a face G, and forms an image on a photosensitive chip. A light beam, mainly blue light and near infrared light, penetrates the face F, passes through a face H, and forms an image on a photosensitive chip. The three photosensitive chips separately receive light waves in particular wavelength ranges, and finally the image processing module implements restoration and reproduction of an image, thereby increasing definition of an optical system, enhancing color restoration, and implementing that an imaging system can form a clear image in environments with different illuminancy.

As shown in FIG. 1 and FIG. 2, in this embodiment, the optical lens 1 is a fixed-focus optical lens, or may be a varifocal optical lens. This is not specifically limited herein.

What is claimed is:

1. An imaging system, comprising an optical lens (1), wherein a spectroscopical module (2) that can split a light wave transmitted from the optical lens (1) into three light waves in different wavelength ranges is disposed on an imaging side of the optical lens (1); and the imaging system further comprises three photosensitive chips (3) configured to receive corresponding light waves, wherein the three photosensitive chips (3) are correspondingly distributed at three light waves emitted by the spectroscopical module (2), and the spectroscopical module (2) is a prism;

wherein the spectroscopical module (2) comprises a first spectroscopical component (21) and a second spectroscopical component (22); the first spectroscopical component (21) splits a light wave transmitted from the optical lens (1) into two light waves, wherein one light wave is transmitted to a photosensitive chip (3), and the other light wave enters the second spectroscopical component (22); and the second spectroscopical component (22) splits the light wave transmitted from the first spectroscopical component (21) into two light waves, and separately transmits the two light waves to corresponding photosensitive chips (3);

the first spectroscopical component (21) and the second spectroscopical component (22) are spaced apart from each other along an optical axis of the optical lens (1) and are oriented parallel to each other;

the wavelength ranges of the three light waves are respectively 600 nm to 680 nm and 820 nm to 880 nm, 500 nm to 580 nm and 820 nm to 880 nm, and 400 nm to 480 nm and 820 nm to 880 nm.

2. The imaging system according to claim 1, wherein the imaging system further comprises an image processor that can integrate and output light waves received by the photosensitive chips (3).

3. The imaging system according to claim 1, wherein the photosensitive chip (3) corresponding to the light wave emitted by the first spectroscopical component (21) is disposed on one side of the first spectroscopical component (21), and the two photosensitive chips (3) corresponding to the two light waves emitted by the second spectroscopical component (22) are disposed on two sides of the second spectroscopical component (22).

4. The imaging system according to claim 1, wherein the optical lens (1) is a fixed-focus optical lens.

5. The imaging system according to claim 1, wherein the optical lens (1) is a varifocal optical lens.

* * * * *